United States Patent
Ersue

(10) Patent No.: US 8,520,067 B2
(45) Date of Patent: Aug. 27, 2013

(54) METHOD FOR CALIBRATING A MEASURING SYSTEM

(75) Inventor: Enis Ersue, Darmstadt (DE)

(73) Assignee: Isra Vision AG, Darmstadt (DE)

( * ) Notice: Subject to any disclaimer, the term of this patent is extended or adjusted under 35 U.S.C. 154(b) by 678 days.

(21) Appl. No.: 11/816,246

(22) PCT Filed: Feb. 8, 2006

(86) PCT No.: PCT/EP2006/001084
§ 371 (c)(1),
(2), (4) Date: Jul. 15, 2008

(87) PCT Pub. No.: WO2006/087123
PCT Pub. Date: Aug. 24, 2006

(65) Prior Publication Data
US 2009/0019916 A1    Jan. 22, 2009

(30) Foreign Application Priority Data
Feb. 17, 2005  (DE) .................. 10 2005 007 536

(51) Int. Cl.
*H04N 7/18*     (2006.01)
*G06F 19/00*    (2011.01)
*G05B 15/00*    (2006.01)

(52) U.S. Cl.
USPC ............................ 348/139; 700/245; 700/259

(58) Field of Classification Search
None
See application file for complete search history.

(56) References Cited

U.S. PATENT DOCUMENTS

| | | | |
|---|---|---|---|
| 6,594,600 B1 | 7/2003 | Arnoul et al. | |
| 6,816,755 B2* | 11/2004 | Habibi et al. | 700/259 |
| 7,512,261 B2* | 3/2009 | Lou et al. | 382/154 |

FOREIGN PATENT DOCUMENTS

| | | |
|---|---|---|
| DE | 297 08 368 | 7/1997 |
| DE | 198 36 303 | 2/2000 |
| EP | 0 763 406 | 3/1997 |
| EP | 1 143 221 | 10/2001 |
| EP | 1 213 683 | 6/2002 |
| EP | 1 245 344 | 10/2002 |
| WO | 99/22281 | 5/1999 |

OTHER PUBLICATIONS

Collins et al., "Calibration of an Outdoor Active Camera System", IEEE Computer Society Conference on Computer Vision and Pattern Recognition, 1999.*

Ji et al., "A Robust Linear Least-Square Estimation of Camera Exterior Orientation Using Multiple Geometric Features," ISPRS Journal of Photogrammetry & Remote Sensing, 2000.*

R. Gerdes et al., "Kalibrierung Eines Digitalen Bildverarbeitungssystems Mit CCD-Kamera", Technisches Messen 6 and 60 (1993), R. Oldenbourg Verlag. pp. 255-288.

(Continued)

*Primary Examiner* — Wen-Tai Lin
(74) *Attorney, Agent, or Firm* — Michael J. Striker

(57) ABSTRACT

A method for calibrating a measuring system uses at least one camera for determining the position of an object in a reference three-dimensional coordinate system. The external and internal parameters of the camera are calibrated in various steps and the position of the camera is determined with the aid of external measuring means in accordance with three steps. In the first step, the internal camera parameters are ascertained and fixedly assigned to the internal camera. In a second step, the position of the internal camera in the measuring system is determined. In a third step, the orientation of the internal camera is ascertained in the reference three-dimensional coordinate system by evaluating camera images.

7 Claims, 1 Drawing Sheet

(56) References Cited

OTHER PUBLICATIONS

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. 3, RA-3, No. 4, Aug. 1987. pp. 323-344.

McGlone et al., "Manual of Photogrammetty", American Society for Photogrammetry and Remote Sensing, 2004.

T. Luhmann, "Nahbereichsphotogrammetrie", Herbert Wichmann Verlag, Heidelberg, 2003. pp. 239, 467-470, and 476-477.

* cited by examiner

METHOD FOR CALIBRATING A MEASURING SYSTEM

BACKGROUND OF THE INVENTION

The present invention relates to a method for calibrating a measuring system based on at least one camera, for determining the position of an object in a reference three-dimensional coordinate system, with which the external and internal camera parameters are calibrated in various steps, and the position of the camera is determined using external measuring means.

Within the framework of the ever-increasing automation of method and production processes using manipulators, e.g., robots, it is necessary to determine the position of objects to be processed in three dimensions, exactly, and in an automated manner, so that the manipulators may grip the objects in a defined manner.

To this end, optical measuring systems are often used that record images of the objects in the working space of the manipulators and evaluate them using image processing, in order to ascertain the orientation of features of the recorded object. Before optical measuring systems of this type may operate, the optical recording systems and/or cameras must be calibrated in a geometric camera model, which is used as the basis for evaluating the images. For the calibration, "internal" camera parameters that relate to the lens properties of the camera and the relative orientation of the lens and the image sensor, e.g., CCD or CMOS sensor, and "external" camera parameters must be determined, which relate to the geometric position, and the position and orientation of the camera in three dimensions.

A large number of various calibration methods for calibrating the camera has been described. An overview of them is provided in the paper by R, Gerdes et. al., "Kalibrierung eines digitalen Bildverarbeitungssystems mit CCD-Kamera" [*Calibrating a digital image processing system with a CCD camera*], tm—Technisches Messen 60 (1993) 6 and 60 (1993) 7/8, R. Oldenbourg Verlag [publisher], in which classical approaches for calibration methods are described. Using an approach derived from photogrammetry, a complete model of the camera is created, and the model parameters are ascertained by evaluating point correspondences. The point coordinates are obtained by recording known two- or three-dimensional point configurations of a calibration body and assigning the image points to the corresponding scene points. The non-linear systems of equations that generally result are solved numerically using iterative searching methods. Calibration methods based on this approach typically require a great deal of computing power, but they also satisfy the highest requirements on accuracy. Furthermore, linear models are known, with which the computing-effort is reduced, but so is the level of accuracy that may be attained. Calibration methods of this type are usually too expensive for an industrial production line, however, and they may not be used in a time-saving and money-saving manner, due, in particular, to post-calibrations that often must be carried out during production. In addition, reasonable starting values for the iteration usually must be specified. This makes it difficult to carry out a fully-automated calibration during the on-going process.

A second group of calibration methods attempts to utilize basic physical and geometric conditions to subdivide the parameters of the camera model into individual groups and to ascertain them in separate, consecutive steps. Via this reduction of the parameters to be determined in one step, the computing effort is reduced considerably compared to an iterative search within the entire parameter space, while also ensuring that the same high level of accuracy may be attained. A method of this type is described, e.g., in the paper by Roger Y. Tsai, "A Versatile Camera Calibration Technique for High-Accuracy 3D Machine Vision Metrology Using Off-the-Shelf TV Cameras and Lenses", IEEE Journal of Robotics and Automation", Vol. RA-3, No. 4, August 1987, according to which geometric conditions are used as the basis for moving the camera, so that camera parameters may be determined separately using simpler systems of equations. This means of attaining the object is not universally usable, however, due to the geometric limitation. It is also disadvantageous that a separate calibration body with certain geometric properties should be used to calibrate the camera. A calibration body of this type must be moved into the field of view of the camera outside of the normal working process. This represents a considerable intervention in the production process. To determine the external camera parameters, it is also necessary to know the position (position and orientation) of the calibration body in the measuring system. This requires a corresponding amount of effort for carrying out the measurement, e.g., using external measuring devices, and it requires that the calibration body be moved into place for the post-calibration in a manner that is reproducible with great accuracy.

Publication EP 1 143 221 A2 describes a similar method for determining the position of a coordinate system of a work piece in three-dimensional space, with which the work piece is recorded using at least two cameras calibrated in three dimensions in order to determine the spacial position of the work piece. The cameras are calibrated in a pin-hole camera model, and the method is intended to be carried out without the use of calibration tables. To this end, when the camera is calibrated, the position and orientation of the radiation entrance window of each camera are measured by measuring the position and orientation of the radiation entrance window of each camera are measured in their passive state using a separate measuring system, which is capable of probing the radiation entrance window directly, and which delivers the position and orientation of the radiation entrance window in the world coordinate system. In this case, a purely external measurement of the camera position takes place, which includes the camera position and camera orientation. The disadvantage is that large, expanded auxiliary means with several measurement marks are required in order to measure the orientation. The auxiliary means are measuring means and must therefore be handled carefully, which is difficult to do in an industrial setting.

A further disadvantage is that the accuracy required for measurements with pixel or subpixel accuracy cannot be attained for large distances between the camera and the measurement object. When the auxiliary means are expanded, e.g., 400 mm with measurement marks on the outer points, and a measurement mark is determined with an accuracy of 0.3 mm, the radiation bundle may be used to calculate that, when the camera is 2000 mm away from the measurement object, an error of 3 mm occurs, which is often inadequate for applications. This situation is illustrated in FIG. 3.

SUMMARY OF THE INVENTION

The object of the present invention, therefore, is to provide a calibrating method that is easy to handle, is highly accurate, and may be incorporated into automated production processes in an optimal manner.

This object is achieved via a calibration method with the features described in claim 1. According to the present invention, the method takes place in at least method steps. In a first method step, the internal camera parameters of a certain camera are ascertained and are fixedly assigned to this camera; in a second method step, the position of the camera mounted in the measuring system is determined, and in a third method step, the orientation of the camera is acertained in the reference three-dimensional coordinate system by evaluating camera images. The aforementioned method steps are broken down according to how they may be implemented in an industrial environment easily and by using current technology.

Initially, the internal parameters of a camera type are ascertained separately, in particular, and they are fixedly assigned to this camera type. Since the determination of these internal camera parameters are independent of the subsequent installation site of the camera, it is sufficient to ascertain these parameters once for each camera type, e.g., in a special measurement laboratory, and to define them as known for further calibration methods with the same camera type.

In a second method step, for which the camera does not yet to be started up at the installation site, the position of the camera installed in the measuring system is ascertained using external measuring means in particular. This measurement is completely independent of the determination of the internal camera parameters and is therefore independent of errors that occur. After the second method step, therefore, the camera parameters related to the imaging properties, and the spacial position of the camera in the world and reference coordinate system have been determined in completely independent measurement procedures. The determination of the absolute position of the camera in the reference coordinate system may be determined using simple standard measuring systems, e.g., laser trackers, which are often fixedly installed anyway on robot-guided systems for measuring purposes.

The determination of the orientation of the camera in three dimensions, which requires a great deal of measurement expenditure compared to the position determination using external measuring means, is determined according to the present invention by evaluating camera images using the camera parameters ascertained in the first two method steps. The image interpretation provided for this purpose is relatively simple, since it is only necessary to evaluate two measurement points known in three dimensions in the camera image of the one camera. In contrast to calibrating methods with which all external and internal camera parameters are obtained from their images themselves, this results in a considerable increase in performance without an associated loss of accuracy, because, as a result of the image evaluation in the third method step, the externally determined position data of the camera and the internal camera parameters are set in relation to each other and are used for the common calibration.

Since an inventive measuring system often needs to be installed in existing work stations, it is important that the installation and calibration of the measuring system may be carried out as quickly as possible, to prevent long down times, e.g., of an assembly or production line. It is advantageous when the first method step for determining the internal camera parameters takes place before the camera is installed in the measuring system, e.g., under laboratory conditions and using a measurement method known per se, particularly by moving a highly accurate calibration body into a camera image. A calibration carried out for a camera type is universally valid for this camera type, so that the first method step need not be repeated every time a measuring system is started up with the same camera type. The efficiency of the inventive method is increased further as a result.

The position of the camera may be determined easily by measuring a single recorded camera point in the form of a measurement mark with a known relationship to the camera.

The advantage of this is that, with the external measuring means for determining the camera position, it is only necessary to aim at, register, and evaluate a single measurement point, by way of which it is possible to determine the position in three dimensions using common measuring means and very little time.

A distinguished feature in the camera housing, e.g., a corner, an edge, or any other point in the camera—which is punctiform, in particular—may be used as the measurement mark. It is also possible, according to the present invention, to fix a measurement mark on the camera in order to measure the position of the camera. To this end, a cover with the measurement mark may be easily inserted and/or screwed into the lens receptacle of the camera and measured with external measuring means, e.g., a laser tracker or a theodolite. Since the design of the camera between lens receptacles and image sensors is known, a simple reference to the internal camera parameters ascertained in the first method step—which relate, in particular, to the lens properties and the geometry of the lens-image sensor arrangement—may be established. Possible position errors are compensated by the orientation calculated based on the image.

After this second method step is carried out, the position of the installed camera is therefore determined in a common, metric reference coordinate system of the measuring system. In this case, "position" means determining the X, Y and Z coordinates of the world coordinate system. The orientation of the camera, i.e., the orientation of the lens in particular, is not yet known after the second method step.

According to the present invention, the orientation of the camera may be determined in a further—particularly the third—method step by detecting two or more features in a camera image. The position of the features in the world and reference coordinate system are known. To solve the equations to be created to determine the three orientations $Rx_k$, $Ry_k$, $Rz_k$, mathematically at least two features depicted using the camera, and their coordinates in the image matrix in the form of two-dimensional image coordinates $X_b$ and $Y_b$, are required. The evaluation of these features in the camera image may take place automatically or in a graphically interactive manner using an image evaluation system installed in a computer. A decisive factor is that the positions of the features in the reference coordinate system that were detected and evaluated in the camera image are known.

According to the present invention, the features may be part of the object whose position is to be measured. Calibration may therefore be carried out without the use of a calibration body when the camera is installed, since it is not necessary to use a calibration body with a known geometry. A calibration body is a body that has been manufactured especially for the purpose of camera and system calibration and that is to be brought into the field of view of a camera. To attain the necessary measurement accuracy when determining all camera parameters using the calibration body, the calibration body must be manufactured with an accuracy that is greater than the aimed—for measurement accuracy by a factor of at least 10. This is not necessary with the current three-step calibration of the measuring system, since it is only necessary to orient the camera in three dimensions using (measurement) features detected in the image. It has been shown that features on the object itself may be used for this purpose. They include advantageously distinguished form elements on the object, e.g., holes, edges, or the like, which are to be handled and measured at the work station anyway.

The position of features depicted in the camera may be determined by measuring using an external measuring means or based on the knowledge of the feature position in object coordinates and subsequently measuring the object position in the reference coordinate system using external means. The feature position in object coordinates may be determined, e.g., based on known design data (CAD), a previous measurement of the feature positions by measuring the object, e.g., in a measurement laboratory, or the like. Instead of measuring the object position in the reference coordinate system, an assumption or a definition of the actual object position at system start-up may be used as the reference system. Optionally, separate measurement features may also be applied artificially to the object to be handled, e.g., via adhesion, magnetic attachment, or the like. In this case, the positions of the object coordinates are not known from the design data, and they are determined using external measuring means.

Optionally, it may be advantageous to move two positions into the camera image using robots installed in the system, and to measure a feature on the robot using the image processing system or, in particular, to aim at it in a graphically interactive manner. Since the robot generally functions in a metrically calibrated manner, the coordinates of the positions of the two robot features in the reference coordinate system are known and may be used for the third method step. This procedure is advantageous in particular for recalibrating cameras, e.g., when a camera fails or is replaced, since the recalibration may take place fully automatically. In this case, method steps one and two do not need to be carried out, since the parameters that were ascertained may be assumed to be constant. The third method step may be carried out fully automatically by a robot, optionally even via an automatic order, thereby ensuring that recalibration is also particularly easy.

With the inventive system, a method for calibrating a measuring system based on a camera for determining object positions in all six degrees of freedom (positions X, Y, Z and orientations $R_x$, $R_y$, and $R_z$) is described, which is highly accurate and may be implemented and installed easily using common auxiliary means.

Further features, advantages, and possible applications of the present invention also result from the following description of exemplary embodiments and the drawing. All of the described and/or depicted features are part of the present invention, either alone or in any combination, independently of their wording in the claims or their back-references.

DETAILED DESCRIPTION OF THE INVENTION

Figure 1:
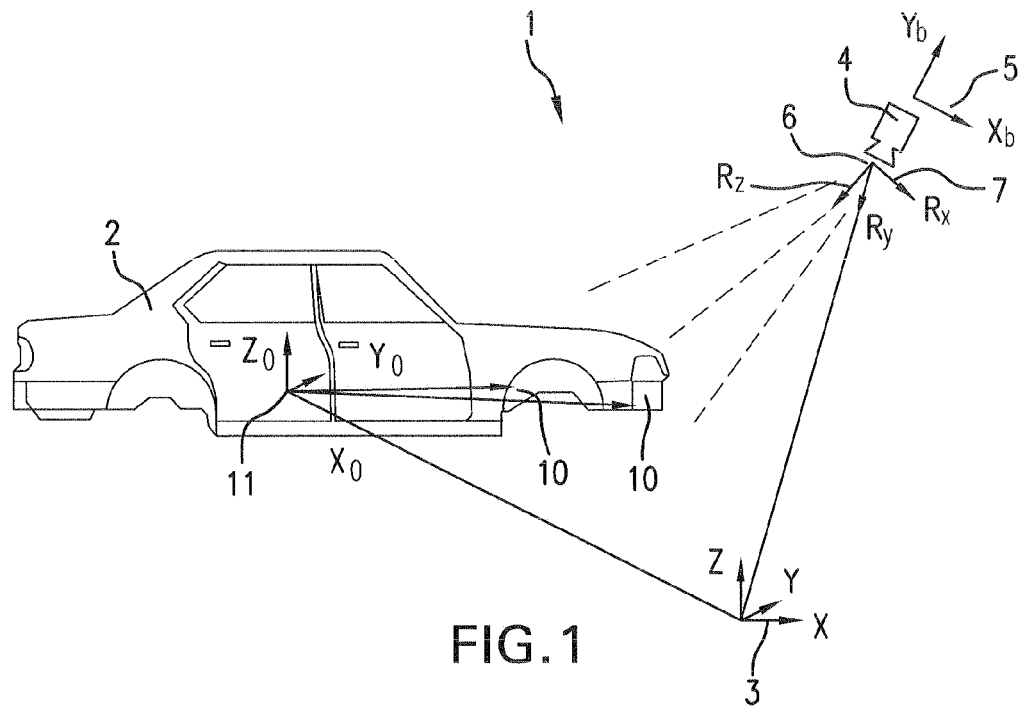
FIG. 1 is a schematic depiction of the measurement set-up for the inventive method for calibrating a measuring system based on at least one camera.

FIG. 1 is a schematic depiction of a measuring system 1 for determining the position of an object 2 designed as a body in a three-dimensional reference coordinate system 3, which represents the world coordinate system. To this end, object 2 is detected using a calibrated optical camera 4, and the position of object 2 is determined using certain object features.

Before it is possible to determine the position and orientation of object 2 in coordinate system 3 using measuring system 1, camera 4 must be calibrated when measuring system 1 is started up.

In this case, "calibration" means establishing an arithmetic relationship between image coordinates $X_b$, $Y_b$ of an image coordinate system 5, camera 4, and a metric reference and/or world coordinate system 3, which generally describes the three-dimensional space with coordinates X, Y and Z. The method used to establish this relationship is to model the physical relationship between the two coordinate systems 3, 5. To this end, all physical attributes that determine the imaging of any point in space on the image sensor of a digital camera 4, in particular, are modeled and registered parametrically.

A distinction is made in this context between internal camera parameters and external camera parameters. The external camera parameters are position 6 and orientation 7 of camera 4 in reference coordinate system 3, which may be registered as a 6-dimensional vector $(X_k, Y_k, Z_k, Rx_k, Ry_k, Rz_k)$. The internal camera parameters are, e.g., image distance f, distortion coefficients Kappa $K_1$ and $K_2$, the expansions of image sensor elements $d_x$ and $d_y$, tilt $\Delta_x$ and $\Delta_y$ of the image sensor plane relative to the optical axis and penetration point $s_x$ and $s_y$ of the optical axis through the image sensor. To calibrate camera 4 used in measuring system 1, the external and internal parameters are calibrated in various steps, which will be described in greater detail below.

In a first of the at least three method steps, the internal camera parameters of camera 4 are ascertained and fixedly assigned to camera 4.

Figure 2:
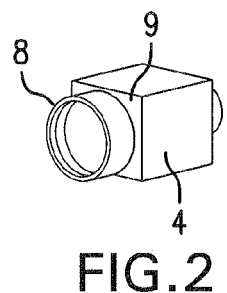
FIG. 2 shows a camera of the measuring system.
Figure 3:
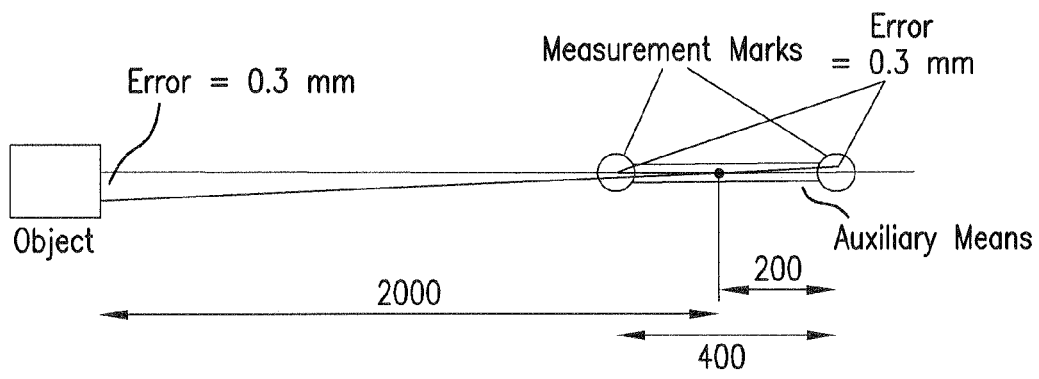
FIG. 3 is a schematic depiction of a configuration for estimating the error.

To this end, camera 4 and lens 8 of camera 4 depicted in FIG. 2 are set up in a separate calibration room, e.g., when measuring system 1 is manufactured and prefabricated. Lens 8 is adjusted—particularly with regard for the object distance and the aperture—to the conditions that will exist when measuring system 1 is subsequently used, and camera 4 is started up. At the object distance, to be planned later, the image of a not-shown calibration body with a known geometry is recorded and evaluated in a manner known per se, to calibrate the camera. In this manner, the internal parameters of camera 4 used for measuring system 1 are determined using lens 8. With this calibration of the internal camera parameters—called "off-site calibration"—which is not carried out at the subsequent installation site of measuring system 1, internal camera parameters 4 for a certain camera 4 are ascertained using a certain lens 8 in predefined recording situations. The internal camera parameters, which may be ascertained in the laboratory before measuring system 1 is installed, apply for all cameras 4 of the same type, and for other cameras and lenses designed adequately similar to the calibrated camera system composed of camera 4 and lens 8.

This method has the advantage that the calibration of the internal camera parameters needs not take place at the subsequent installation site—when time is a critical factor in the set-up of measuring system 1—and that it is typically easier to ascertain the internal camera parameters with sufficient accuracy under laboratory conditions. The present invention is not limited to carrying out the first method step in the manner described above, however. In an equivalent manner, the first method step may also be carried out after camera 4 with lens 8 is fixedly installed at the application site, i.e., when on-site calibration is carried out. To this end, a calibration body is positioned near the application site, and the internal camera calibration is carried out. The position of the calibration body in the reference coordinate system need not be known. External measuring means are therefore not required for this. It is only necessary that the calibration body be registered by camera 4 and depicted as an image. After the internal camera parameters of the combination of camera 4 and lens 8 are determined—which basically takes place in exactly the same manner as the method variant described above—the calibration body is removed. Although this calibration of the internal camera parameters requires more time in terms of setting up measuring system 1, the quality of the results is basically the same. With this variant, the first and second method step may be switched.

After camera 4 of measuring system 1 is installed at the final installation site, position 6 of camera 4 is determined in a second method step, i.e., coordinates $X_k$, $Y_k$, $Z_k$ of the camera are determined in reference coordinate system 3. To this end, it is possible to leave the installed unit composed of camera 4 and lens 8—particularly after the lens has been set up and adjusted to the desired image range to record object 2—in this orientation, and to apply a measurement mark 9 on the housing, or to use a distinguished, preferably punctiform, in particular, feature of the camera housing as measurement mark 9. The position of measurement mark 9 in reference coordinate system 3 is determined accurately by performing an external measurement, e.g., using a laser tracker or theodolites. Based on the knowledge of the geometry of the housing of camera 4 and the position of the image sensor relative thereto, relevant camera position $X_k$, $Y_k$, $Z_k$ may be deduced. This measurement of camera position 6 has the advantage that it may be carried out with camera 4 in the final installed state.

In a variant of the second method step, it is also possible to remove lens 8 from fixedly installed camera 4 and to install a measurement mark 9 in the normalized, highly accurate lens receptacle of camera 4. In this case as well, the position of measurement mark 9 is determined by performing an external measurement. The camera position may be deduced based on the known, constant relationship between measurement mark 9 and the image sensor in camera 4 or other camera reference features.

After the external determination of position 6 of camera 4 in three dimensions is carried out, orientation 7 of the camera, i.e., the orientation of lens 8, must be determined. To this end, camera images are evaluated in a third method step, to ascertain orientation 7 of camera 4 in reference three-dimensional coordinate system 3.

The calculation of orientation 7 of camera 4 in three dimensions and/or of external camera parameters in general is based on solving equations for the projective image. This approach is called the pin-hole camera model. The pin-hole camera model is founded on the basic condition—which applies for all three-dimensional points—that the line of sight of each three-dimensional point (X, Y, Z) must pass through the center of projection, which is formed by the hole in the pin-hole camera. The point of impact of the line of sight on the image sensor determines image coordinates $X_b$ and $Y_b$. Two equations that follow the law of radiation may then be created for each three-dimensional point:

$$\frac{X_b}{f} = \frac{X_k}{Z_k} \quad (1)$$

and $$\frac{Y_b}{f} = \frac{Y_k}{Z_k}, \quad (2)$$

whereby f is the image distance, and $X_k$, $Y_k$, and $Z_k$ are the coordinates of the three-dimensional point in the camera coordinate system.

The following applies for the coordinates of the three-dimensional point in the camera reference coordinate system $$X_k = T_k * X \quad (3),$$

whereby $X_k$ represents the coordinates of the three-dimensional point in the camera reference coordinate system, expressed as a vector, X represents the coordinates of the three-dimensional point in the world reference system, expressed as a vector, and $T_k$ is a transformation matrix with size 4×4 (expressed using homogeneous coordinates) from the camera reference system to the world reference system.

The transformation matrix is calculated unequivocally based on the six parameters $X_k$, $Y_k$, $Z_k$, $Rx_k$, $Ry_k$, $Rz_k$ of the external camera parameters. For the method under consideration, the translatory parameters of camera position $X_k$, $Y_k$, $Z_k$ are known. When only one three-dimensional point is measured, it is therefore not possible to determine the three unknown $Rx_k$, $Ry_k$, $Rz_k$ using the two equations. At least two three-dimensional points are therefore required in order to calculate the three orientations $Rx_k$, $Ry_k$, $Rz_k$ based on the resultant four equations (1) and (2).

To this end, a measurement object 2, e.g., in the form of a body as shown in FIG. 2, is positioned at the measurement site, and two or more measurement features 10 that are visible in the camera image are used to determine camera orientation 7. The position of measurement features 10 in reference coordinate system 3 is known. The following alternatives are feasible.

The position of measurement features 10 may be determined in an object coordinate system 11 with coordinates $X_0$, $Y_0$, $Z_0$ (in vector notation $X_0$). To ascertain measurement features 10 in reference coordinate system 3, it is only necessary in this case to determine the position of object 2 in reference coordinate system 3, e.g., by performing an external measurement. The position data of measurement features 10 in reference coordinate system 3 are then calculated based on the relationship $$X = T_0 * X_0 \quad (4),$$

whereby $T_0$ is a transformation matrix of size 4×4 from reference coordinate system 3 to object coordinate system 11.

Instead of determining the position data of measurement features 10 in object coordinate system 11 based on design data, they may also be ascertained by measuring object 2, e.g., in a measurement laboratory. Since these positions of measurement features 10 of object 2 in object coordinate system 11 are often known anyway, it is often easier—instead of measuring all measurement features 10 directly using external measuring means—to only measure the position of object 2 once in reference coordinate system 3 and to calculate back to the position of measurement features 10 as shown.

Instead of using measurement features 10 of an object 2 used in the method steps anyway to determine orientation 7 of camera 4, special measurement marks may also be applied on any measurement object, the position of which may be determined by performing an external measurement directly at the application site or by performing a measurement in advance in object coordinate system 11 and measuring the position of object 2 at the application site. As an alternative, a separate calibration body may also be used at the application site, the position of which in reference coordinate system 3 is determined, based on which measurement features 10 in reference coordinate system 3 may be derived. This may take place based on a known geometry of the calibration body or by measuring the position of the measurement features directly.

Via the three-step calibration—the calibration steps of which do not necessarily have to take place in direct succession—of camera 4 used in measuring system 1, the internal and external camera parameters may be ascertained with relatively little effort, and measuring system 1 may be set up as quickly as possible. This applies, in particular, for the method variants in which the internal parameters for the system composed of camera 4 and lens 8 are ascertained in the first method step before installation and are assigned to camera 4, and in which the third method step is carried out based on the measurement features present on object 2, since, when a system is started up, the procedure must be checked anyway, in which case object 4 is measured exactly. Based on these data, the entire camera calibration may be carried out without the calibration being delayed by its own method steps.

This calibration—method steps two and three, in particular—may also be carried out during on-going operation without interrupting production to recalibrate measuring system 1.

| Reference numerals: | |
| --- | --- |
| 1 | Measuring system |
| 2 | Object, body |
| 3 | Reference and/or world coordinate system |
| 4 | Camera |
| 5 | Image coordinate system |
| 6 | Position of the camera |
| 7 | Orientation of the camera |
| 8 | Lens |
| 9 | Measurement mark |
| 10 | (Measurement) feature |
| 11 | Object coordinate system |

What is claimed is:

1. A method for calibrating a measuring system (1) based on at least one camera (4) for determining the position of an object (2) in a reference three-dimensional coordinate system (3), in which the external and internal parameters of the camera are calibrated in various steps, the method comprising at least three steps:

in a first method step, the internal camera parameters of a certain camera (4) are ascertained and fixedly assigned to this camera (4) before the camera (4) is installed in the measuring system (1);

in a second method step, using the assigned internal camera (4) parameters, the position (6) of the camera (4) mounted in the measuring system (1) is determined with the aid of external measuring means by measuring a recorded camera point located in a known relation to the camera (4), and in a third method step, using the determined position (6) of the camera (4), ascertaining an orientation (7) of the camera (4) in the reference three-dimensional coordinate system (3) by evaluating camera images, including recording two or more features (10) of the object (2) in one camera image, wherein positions of the two or more features (10) in the reference coordinate system (3) are known;

wherein the steps are executed in sequential order and non-iteratively.

2. The method as recited in claim 1, wherein a measurement mark (9) may be fixed on the camera (4) in order to measure the position (6) of the camera (4).

3. The method as recited in claim 1, wherein the features (10) are part of the object (2), and wherein the position of the object is to be measured.

4. The method as recited in claim 1, wherein, the positions of the two or more features (10) are measured using external measuring means.

5. The method as recited in claim 1, wherein the position of the features (10) in an object coordinate system (11) are known or they are determined, and the position of the object (2) in the reference coordinate system (3) is determined.

6. The method as recited in claim 1, wherein the features (10) are distinguished components of the object (2).

7. The method as recited in claim 1, wherein the features (10) are defined by a feature fixed on a handling device or a robot, which is capable of being moved, in a calibrated manner, into the camera image, and is then measured in at least two positions.

* * * * *